Nov. 7, 1944.  J. C. PARKIN ET AL  2,362,023
FLEXIBLE GUN MOUNT
Filed March 20, 1941  4 Sheets-Sheet 1
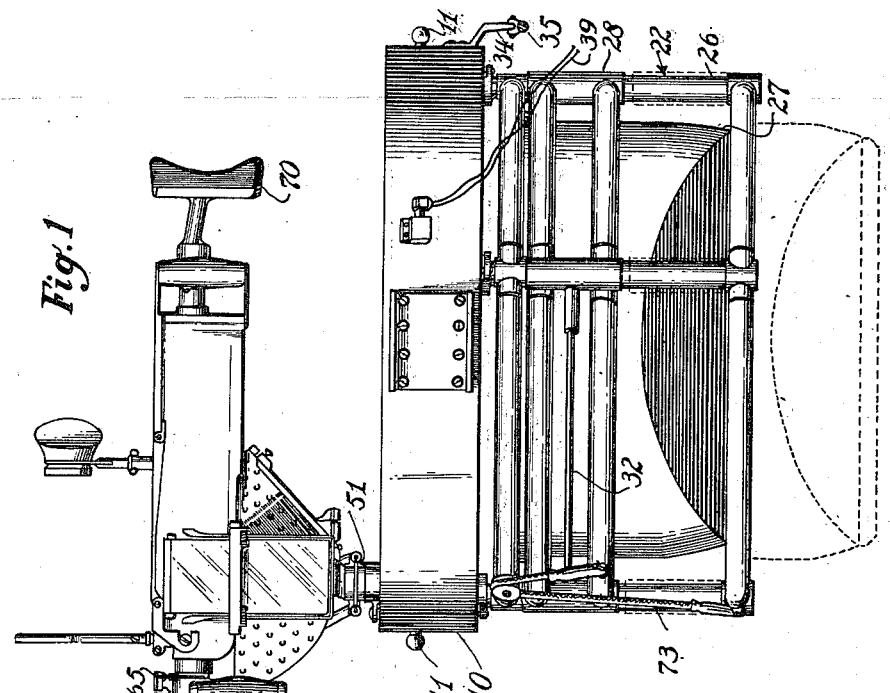
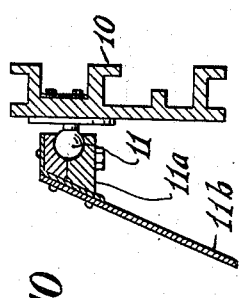
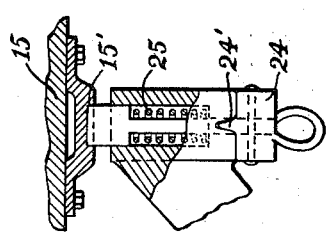
INVENTORS
JOHN C. PARKIN AND
BRUCE G. EATON
BY
ATTORNEY Nov. 7, 1944.    J. C. PARKIN ET AL    2,362,023
FLEXIBLE GUN MOUNT
Filed March 20, 1941    4 Sheets-Sheet 2

INVENTORS
JOHN C. PARKIN AND
BRUCE G. EATON
BY
ATTORNEY

Nov. 7, 1944.   J. C. PARKIN ET AL   2,362,023
FLEXIBLE GUN MOUNT
Filed March 20, 1941   4 Sheets-Sheet 4

INVENTORS
JOHN C. PARKIN AND
BRUCE G. EATON
BY
ATTORNEY

Patented Nov. 7, 1944

2,362,023

UNITED STATES PATENT OFFICE 2,362,023

FLEXIBLE GUN MOUNT

John C. Parkin and Bruce G. Eaton, Buffalo, N. Y., assignors to Curtiss-Wright Corporation, a corporation of Delaware Application March 20, 1941, Serial No. 384,318

12 Claims. (Cl. 89—37.5)

This invention relates to armament for aircraft, and is particularly concerned with improvements in flexible gun mounts. In some respects, the present invention comprises improvements in the structures shown in Patents Nos. 1,968,182; 2,137,640, and 2,175,931. The first of said patents shows a machine gun flexibly mounted on a carriage which is movable along an irregularly shaped track secured in the aircraft. The second patent mentioned shows the same form of gun mount with improvements in the track arrangement. The structure shown in the third patent includes improvements in the gun carriage and gunner seating provisions by which freedom of operation of a large-sized gun in small space is assured.

As the aircraft art progresses, speeds of aircraft increase, space alloted to the gunner is not enlarged, but full flexibility of flexible machine guns must be retained. The present invention has for an object the provision of a gun mount of small compass by which full freedom of the gunner is assured, and by which gun pointing over a wide range of elevation and azimuth may be assured. A further object is to provide a gun mount which includes a flexibly arranged seat for the gunner which may be moved to such a position that the gunner may operate aircraft controls and other equipment without interference with the gun, which latter may be moved to such a position as not to interfere with the gunner's freedom of movement. Still another object is to provide a gun mount wherein the gun is mounted on a carriage movable along a track and wherein the track may be bodily tilted in elevation to enable the gunner to point the gun substantially vertically upwardly with respect to the aircraft, while still retaining full compactness of the mount organization. A further object is to provide control means for the gun mount and carriage which may be readily operated by the gunner in all aiming positions of the gun and locations of the gunner's seat in its mounting.

Further objects of the invention will become apparent in connection with the annexed detailed description taken with the drawings, in which:

Fig. 1 is a front elevation of a gun mount according to the invention showing the gun pointing sideways;

Fig. 9 is a section through the track and body at a track pivot; and

Fig. 10 is a detail view of the gun seat locking pin.

Figure 4:
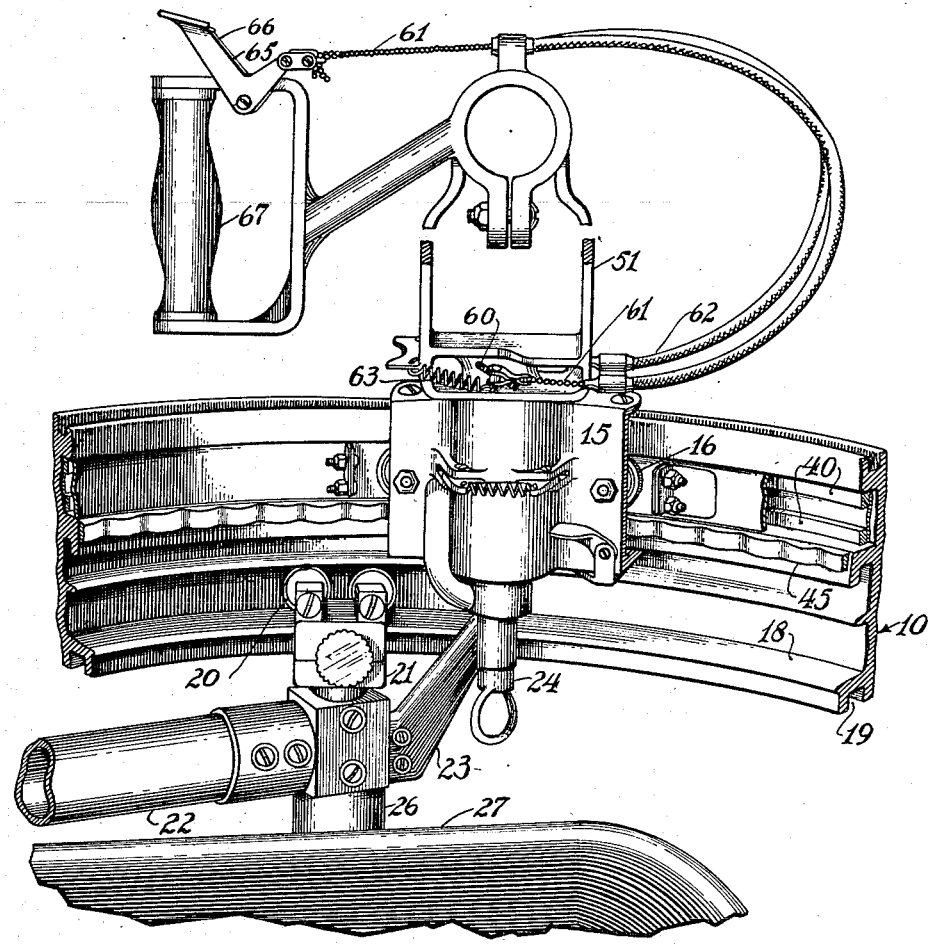
Fig. 4 is an enlarged fragmentary perspective view of a portion of the track, the gun carriage and a portion of the gunner's seat.
Figure 5:
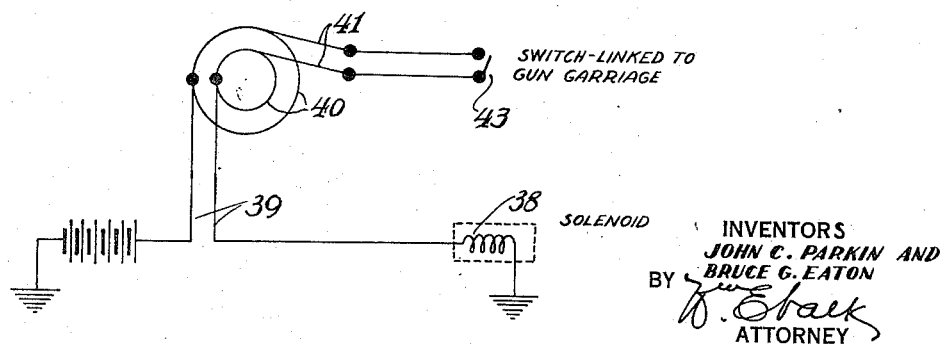
Fig. 5 is a wiring diagram for certain control components of the gun mount.

The gun mount assembly is shown as a unit without respect to the airplane in which it is installed. It comprises a substantially circular rigid track element 10 provided with diametrically opposed pivots 11 on which the ring is mounted for tilting, cooperating bearings for the pivots 11, not shown, being mounted on side elements of an aircraft body or fuselage, whereby the ring may be tilted in a fore and aft direction. The pivots 11 are balls as shown in Fig. 9, and are engaged in socket bearings 11a rigid with the aircraft body 11b. The ring comprises a structural tie or brace between the opposite body edges. The track, which is shown in section in Fig. 6, includes upwardly and downwardly facing grooves 12 and 13, and an inwardly facing groove 14 upon which a carriage 15 is mounted through rollers 16, whereby the carriage may be moved throughout the circumference of the track. The lower portion of the track is provided with grooves 18 and 19 which receive rollers 20 borne by fittings 21 forming part of a seat assembly 22, as shown in Fig. 4. The seat assembly includes a bracket 23 carrying a movable pin 24 having a stem portion engageable within a recess 15' formed in a member secured to or forming part of the gun carriage 15. Preferably the pin 24 is urged toward engagement with the gun carriage recess by a spring 25. The pin 24 also may be provided with one or more lugs 24' receivable within notches in the bracket 23 which are so arranged that the pin may be locked in a withdrawn position simply by outwardly withdrawing and then rotating the pin 24. Upon disengagement of the pin 24 from the carriage 15, the seat and carriage may be moved independently of one another so that the gun and carriage may be moved to an out-of-the-way position, and the seat may be moved to a fore-and-aft position appropriate to other than gunnery functions by the gunner.

The seat assembly 22 includes a plurality of vertical tubes 26 to which a seat 27 is secured through sleeves 28, the latter being slidable vertically over the tubes 26 to allow for adjustment of the height of the seat 27 with respect to the ring 10. A lock 30 on each sleeve 28 enables the gunner to lock the seat in any appropriate position, and a coincidental operator 31 is secured to the seat 27 and is connected to the several locks 30 by flexible control cables 32.

Figure 2:
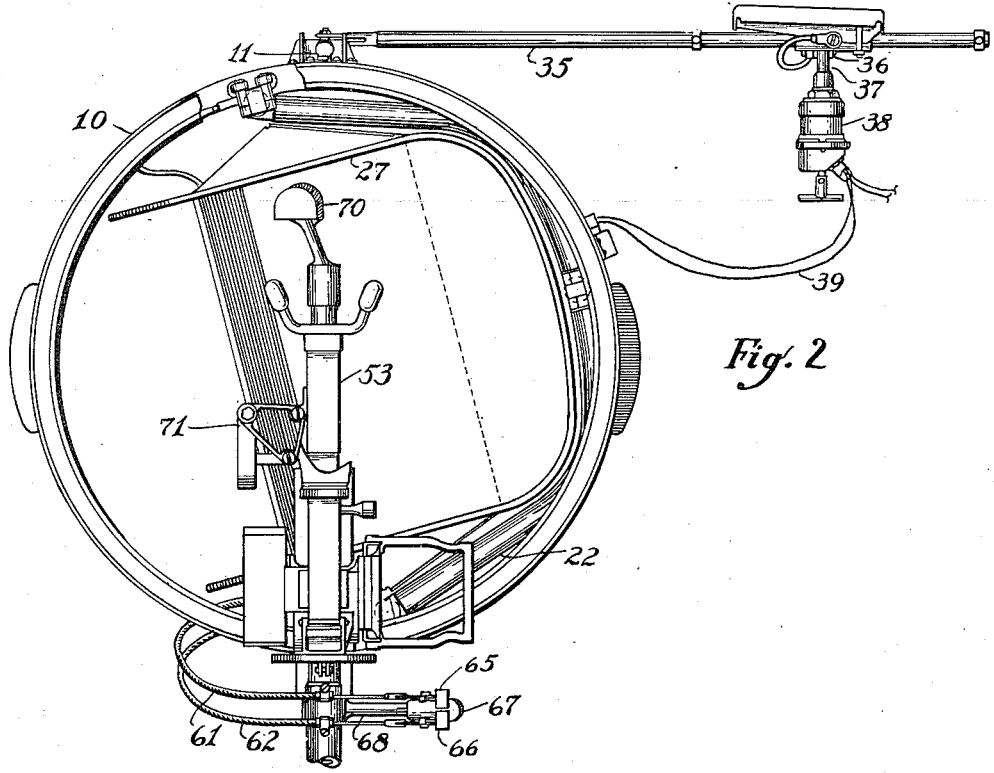
Fig. 2 is a plan of the arrangement of Fig. 1.
Figure 3:
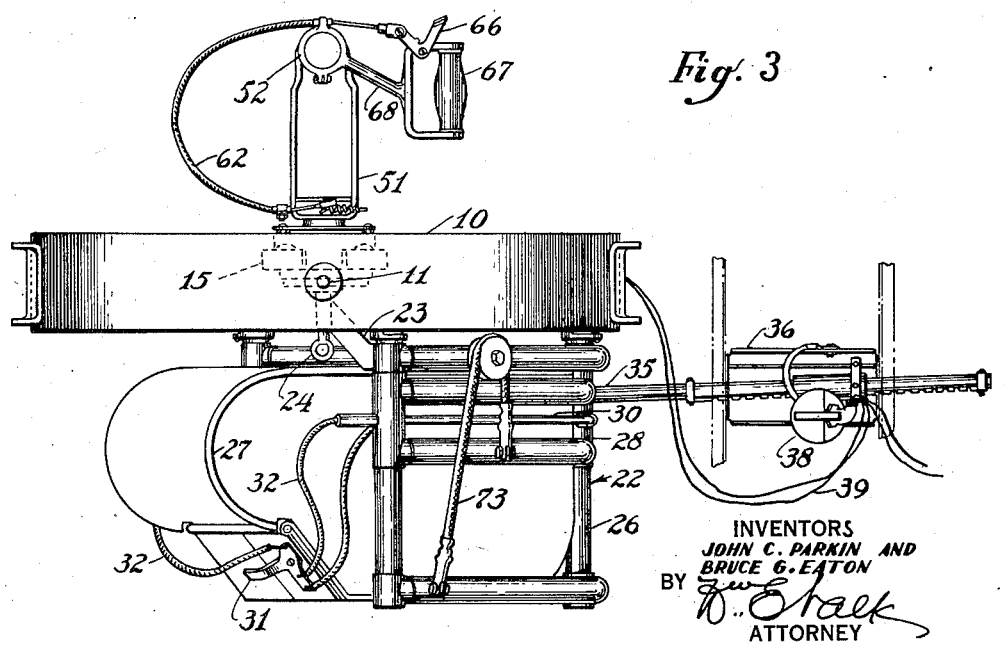
Fig. 3 is a side elevation of the gun mount.
Figure 6:
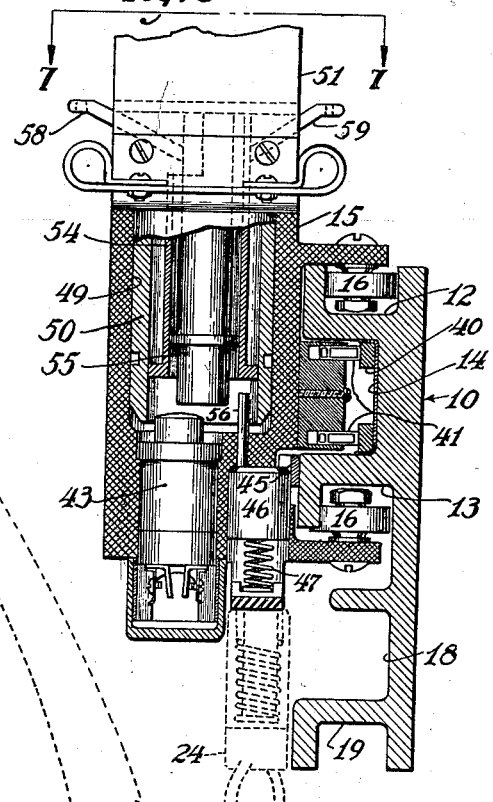
Fig. 6 is a section through the gun carriage and track.
Figure 7:
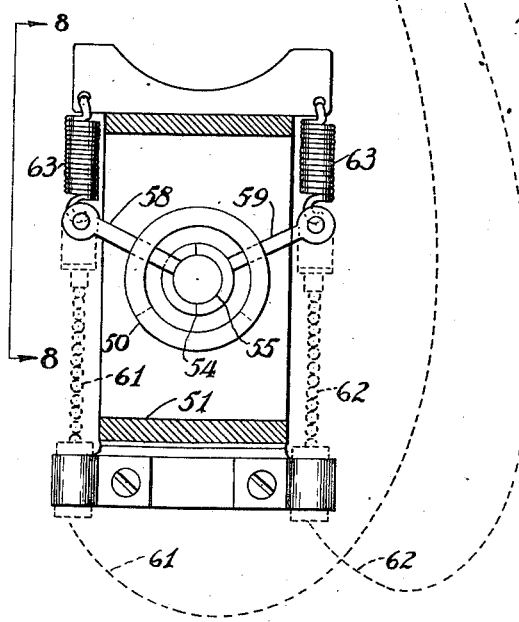
Fig. 7 is a section on the line 7—7 of Fig. 6.
Figure 8:
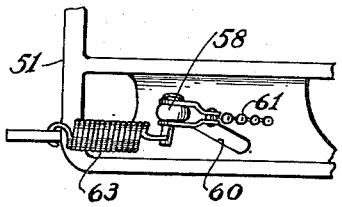
Fig. 8 is a section on the line 8—8 of Fig. 7.

Below one of the pivots 11 on the ring 10, a lever 34 is attached, whose lower end is clevised to a rod 35 extending along the side of the aircraft body to a fitting 36 upon which is mounted a slidable bolt 37 engageable with notches formed in the rod 35, as shown in Fig. 3. Withdrawal of the bolt by means of a solenoid 38 mounted on the fitting 36 allows the gunner to tilt the ring 10 about its pivots 11 whereupon the solenoid is released and the bolt 37 engages the rod 35 to lock the ring 10 in any appropriate position of tilt. Control of the solenoid 38 is afforded through wires 39 connected to slip rings 40 mounted within the groove 14 of the track 10, in insulating relation thereto, as shown in Figs. 4 and 6. The carriage 15 carries brushes 41 engaging the rings 40 which are connected by wiring, not shown, to a plunger switch 43 in the carriage.

The track 10, on its inner surface, is provided with a waved surface ring 45 with which a vertically movable bolt 46 in the carriage 15 cooperates to lock the carriage from movement along the track. This bolt is pressed upwardly by a spring 47 (Fig. 6) so that the bolt 46 is normally moved toward locking engagement with the track.

The carriage 15 is provided with a socket 49 into which a projection 50 of a gun carrying adapter 51 is inserted, the adapter having means 52 to secure an automatic gun 53 therein. The adapter projection 50 is tubular and slidable and within it are concentric plungers 54 and 55, the former being movable vertically downwardly to engage a pin 56 carried by the plug 46, and the latter, 55, being movable downward to engage the switch 43 for actuation of the solenoid 38. Vertical movement of the plungers 54 and 55 is accomplished through the interconnection of levers 58 and 59 secured respectively to the plungers 55 and 54 which protrude through sloped cam slots 60 in the adapter 51. Flexible pull cables 61 and 62 are secured to levers 58 and 59, respectively, and it will be apparent that pulling either of these cables will rotate the plungers 54 and 55 and will cam them downwardly to engage the switch 43 and the pin 56, respectively. The levers 58 and 59 are normally held in one extreme position by springs 63, while the cables 61 and 62 are led to bell cranks 65 and 66 mounted on a hand grip 67 secured to the gun 53 through a bracket 68. Said grip 67 is normally mounted on the left side of the gun and is engaged by the left hand of the gunner. The gun is provided with a stock 70 at its rearward end and with a trigger grip 71 on its right hand side.

In using the gun mount, the gunner is seated in an offset position with respect to the gun, substantially alongside of the gun. His right upper arm engages the stock 70, while his right hand engages the trigger grip 71 and manipulates the gun triggers associated therewith. The gunner's left hand, engaging the grip 67, enables the gun to be moved about and pointed at will, and the bell cranks 65 and 66 are immediately available to the pilot's left hand for releasing of the gun carriage for movement along the track, and for releasing of the carriage with respect to its pivots 11 to allow of tilting of the track bodily with the gun carriage and gun to enable the gunner to fire the gun in a substantially vertical line with respect to the aircraft. At any time, the seat 27 may be adjusted vertically by manipulation of the control handle 31.

The seat 27 is counterbalanced against the weight of the gunner by elastic cords 73.

In the prior art, gun mount and seat assemblies have been shown adapted for use in confined quarters, wherein the gun is mounted as a part of the seat, and the seat is both rotatable and tiltable. Such an arrangement, however, is not as flexible in use as an arrangement of the character here disclosed, since the gun carrying mechanism on the seat may not be readily removed from the seat and may at times interfere with the activity of the gunner when he is not operating the gun. In the present system, complete flexibility is afforded for gun operation with the seat and gun movable jointly as a unit, but when desired, the seat and gun which are independently supported on the gun ring, may be uncoupled from one another to allow of independent movement of the gun and seat, thus affording a universality of operation which is not believed to be present in the arrangements of the prior art.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. A gun mount for aircraft comprising a track trunnioned at opposed points thereof upon the aircraft structure for tilting movement, a carriage movable along the track, means to lock the carriage to the track, means to lock the track in available positions of tilt, an element controlling each said locking means on the carriage, a seat carrying structure carried by and movable both with and with respect to said carriage around the track, and means selectively operable to lock the carriage and seat structure to one another for joint movement or to release the seat structure for independent movement.

2. In a gun mount for aircraft, a track mounted in the aircraft, a gun carriage mounted on and movable along the track, a seat carrying structure independently mounted on and independently movable along the track, and means to secure the carriage and structure together for joint movement.

3. A gun mount for aircraft comprising a circular track pivotally mounted at diametrically opposed points thereof to the aircraft for tilting movement with respect thereto, and a gun carriage movable throughout the track periphery in any tilt position of the track.

4. A gun mount for aircraft comprising a circular track pivotally mounted at diametrically opposed points thereof to the aircraft for tilting movement with respect thereto, a gun carriage movable throughout the track periphery in any tilt position of the track, and selectively operable means to lock the carriage to the track and to lock the track against tilting, both said means being controlled from the carriage.

5. In an aircraft gun mount comprising a circular gun carriage track tiltably mounted at diametrically opposed points, a gun carriage mounted for movement along said track in any position of tilt of the track, a solenoid operated bolt for locking the track against tilt, a conducting strip connected to the solenoid and extending completely around the track, a contact brush on the carriage engaged with the strip, and switch means on the carriage in circuit with said brush to control solenoid energization.

6. In aircraft comprising a body having a substantially circular cutout in its surface, a ring member disposed in the cutout and trunnioned at the ends of a diameter thereof to the body sides whereby the ring is tiltable thereon, a gun carriage controllably movable throughout the periphery of the ring member and mounted thereon, and a seat carriage mounted on the ring member for movement throughout its periphery both with the gun carriage and independently thereof.

7. In a gun mount for aircraft, a track, a carriage movable therealong, said carriage having a socket, a gun carrying adapter including a tenon engageable with the socket for traverse on the socket axis, means to lock the carriage against movement along the track including an operating element therefor projecting into the socket, and a device carried by and movable relative to said tenon, and bodily removable from the carriage with the adapter, engageable with said operating element for operating said locking means.

8. In a gun mount comprising a carriage movable along a track the carriage having a socket, a gun carrying adapter removably fitted to said socket for movement about the socket axis, mechanism on the carriage for locking it to the track, and a control for said mechanism passing therefrom through the socket to said adapter, said control including a separable connection in the socket which is separated upon removal of the adapter from the carriage.

9. A gun mount for aircraft comprising a circular track pivotally mounted on said aircraft at diametrically opposed points on said track for tilting movement with respect to said aircraft, a gun carriage mounted on and movable along said track in any position of tilt of said track, and a seat-carrying structure movable with said carriage around said track.

10. A gun mount for aircraft comprising a movable gun carriage, means operable to lock said carriage in position, a gun-carrying adapter removably mounted on said carriage for relative rotative movement, means carried by said adapter for controlling said locking means in all relative rotative positions of said adapter and carriage, said last named means being removable with said adapter from said carriage.

11. A gun mount for aircraft comprising a track tiltably mounted on said aircraft, a gun carriage movable along said track, means operable to lock said track in available positions of tilt, means operable to lock said carriage to said track, a gun-carrying adapter removably mounted on said carriage, and means supported by said adapter for controlling both said locking means.

12. In aircraft comprising a body having a substantially circular cutout in its surface, a ring member disposed in the cutout and trunnioned at the ends of a diameter thereof to the body sides whereby the ring is tiltable thereon, and a gun carriage mounted on said ring member and controllably movable throughout its periphery in any position of tilt of said ring member.

JOHN C. PARKIN.
BRUCE G. EATON.